US010506575B2

(12) United States Patent
Lei et al.

(10) Patent No.: US 10,506,575 B2
(45) Date of Patent: Dec. 10, 2019

(54) RESOURCE ALLOCATION METHOD AND SYSTEM, DEVICE HAVING BASE STATION FUNCTIONALITY, AND TERMINAL

(71) Applicant: Yulong Computer Telecommunication Scientific (Shenzhen) Co., Ltd., Shenzhen, Guangdong (CN)

(72) Inventors: Yixue Lei, Guangdong (CN); Chenlu Zhang, Guangdong (CN); Yajun Zhu, Guangdong (CN); Mingju Li, Guangdong (CN); Yunfei Zhang, Guangdong (CN)

(73) Assignee: Nanchang Coolpad Intelligent Technology Company Limited, Nanchang (CN)

( * ) Notice: Subject to any disclaimer, the term of this patent is extended or adjusted under 35 U.S.C. 154(b) by 245 days.

(21) Appl. No.: 15/587,749

(22) Filed: May 5, 2017

(65) Prior Publication Data
US 2017/0245248 A1 Aug. 24, 2017

Related U.S. Application Data

(63) Continuation-in-part of application No. PCT/CN2014/092619, filed on Nov. 29, 2014.

(30) Foreign Application Priority Data

Nov. 6, 2014 (CN) .......................... 2014 1 0625884

(51) Int. Cl.
*H04W 72/04* (2009.01)
*H04W 64/00* (2009.01)
(52) U.S. Cl.
CPC ......... *H04W 72/042* (2013.01); *H04W 64/00* (2013.01); *H04W 72/044* (2013.01)

(58) Field of Classification Search
CPC ........... H04W 72/042; H04W 72/1231; H04W 72/044; H04W 64/00; H04W 16/02; H04W 72/1252; H04W 72/1242
(Continued)

(56) References Cited

U.S. PATENT DOCUMENTS

2013/0272182 A1* 10/2013 Li ......................... H04W 28/02
370/311
2013/0303160 A1* 11/2013 Fong ....................... H04W 4/90
455/426.1

(Continued)

FOREIGN PATENT DOCUMENTS

CN 102244573 A 11/2011
CN 102244873 A 11/2011
(Continued)

OTHER PUBLICATIONS

Sony, Open Issues on RRC Signalling for resource authorization [online], 3GPP TSG-RAN WG2#87bis R2-144405, <URL: http://www.3gpp.org/ftp/tsg_ranWG2_RL2/TSGR2_87bis/Docs/R2-144405.zip>, Oct. 10, 2014 (Oct. 10, 2014), section 2.
(Continued)

*Primary Examiner* — Kwang B Yao
*Assistant Examiner* — Syed M Bokhari
(74) *Attorney, Agent, or Firm* — Young Basile Hanlon & MacFarlane, P.C.

(57) ABSTRACT

The present disclosure provides a resource allocation method and system used for direct terminal-to-terminal communication, a device having base station functionality, and a terminal. The resource allocation method includes: obtaining time-frequency resource usage of the device having the base station functionality and/or state information of each D2D terminal within a coverage area of the device having the base station functionality; determining an allo-
(Continued)

cation mode of allocating time-frequency resource to the each D2D terminal, according to the time-frequency resource usage of the device having the base station functionality and/or the state information of the each D2D terminal; and allocating time-frequency resource used for the direct terminal-to-terminal communication to the each D2D terminal according to the allocation mode, so as to enable the each D2D terminal to use the allocated time-frequency resource to perform the direct terminal-to-terminal communication.

20 Claims, 5 Drawing Sheets

(58) Field of Classification Search
USPC .......................... 370/329, 350, 328, 311, 331
See application file for complete search history.

(56) References Cited

U.S. PATENT DOCUMENTS

| | | | | |
|---|---|---|---|---|
| 2014/0056220 A1* | 2/2014 | Poitau | .................... | H04W 76/14 370/328 |
| 2015/0146687 A1* | 5/2015 | Kim | ...................... | H04W 76/14 370/331 |
| 2015/0181584 A1 | 6/2015 | Morita et al. | | |
| 2015/0223111 A1* | 8/2015 | Lindoff | ................. | H04W 24/02 370/252 |
| 2015/0223217 A1* | 8/2015 | Chen | ..................... | H04W 72/00 370/329 |
| 2015/0271846 A1* | 9/2015 | Kowalski | .............. | H04W 72/14 370/329 |
| 2016/0044619 A1* | 2/2016 | Ryu | ....................... | H04W 76/14 370/350 |
| 2017/0142741 A1* | 5/2017 | Kaur | ................... | H04W 56/002 |

FOREIGN PATENT DOCUMENTS

| | | |
|---|---|---|
| CN | 103079262 A | 5/2013 |
| CN | 103442442 A | 12/2013 |
| CN | 103781050 A | 5/2014 |
| WO | 2013139041 A1 | 9/2013 |
| WO | 2014003090 A1 | 1/2014 |

OTHER PUBLICATIONS

Potevio, D 2D Communication Resource Allocation and mode switch [online], 3GPP TSG-RAN WG2#86 R2-142481, <URL: http:// www.3gpp.org/ftp/tsg_ran/WG2_RL2/TSGR2_86/Docs/R2-142481.zip>, May 23, 2014 (May 23, 2014), section 2.3.

ZTE, Discussion on the coordination of D2D resource for inter-cell D2D discovery and communication [online], 3GPP TSG-RAN WG3#83 R3-140047, <URL: http:// www.3gpp.org/ftp/tsg_ran/WG3_lu/TSGR3_83/Docs/R2-140047.zip>, Feb. 14, 2014 (Feb. 14, 2014), section 2.3.2.

Samsung, Introduction of ProSe [online], 3GPP TSG-RAN WG2#87bis R2-144708, <URL: http:// www.3gpp.org/ftp/tsg_ran/WG2_RL2/TSGR2_87bis/Docs/R2-144708.zip>, Oct. 10, 2014 (Oct. 10, 2014), sections 5.X.4 and 6.3.1.

* cited by examiner

RESOURCE ALLOCATION METHOD AND SYSTEM, DEVICE HAVING BASE STATION FUNCTIONALITY, AND TERMINAL

CROSS-REFERENCE TO RELATED APPLICATION(S)

This application is a continuation-in-part of International Patent Application PCT No. PCT/CN2014/092619 filed on Nov. 29, 2014, which claims priority to Chinese Patent Application No. 201410625884.X, filed on Nov. 6, 2014. The aforementioned patent applications are hereby incorporated by reference in their entireties.

TECHNICAL FIELD

The present disclosure relates to a technical field of communications, and in particular, to a resource allocation method used for direct terminal-to-terminal communication, a resource allocation system used for direct terminal-to-terminal communication, a device having base station functionality and a terminal.

BACKGROUND

With development of hardware and software technology of mobile terminals and wireless communication technology, direct terminal-to-terminal communication technology (Device to Device, i.e., D2D, which is a direct terminal-to-terminal communication technology introduced in the 3GPP Rel-12, allowing users to transmit data not via cellular network infrastructure) gradually becomes an important technology. The D2D technology mainly includes D2D discovery (i.e., discovery phase) and D2D communication (i.e., communication phase). The D2D discovery and the D2D communication are independent services. The D2D communication allows two user equipment to directly send and transmit data via a specific channel (sidelink channel), without transmitting via a base station. The D2D communication can be used for commercial scenarios and public security scenarios, and is a technology highly valued by many states and multinational companies currently, and is also a technology which may have a significant impact on terminal products in future.

The D2D communication includes a scenario with network coverage and a scenario without network coverage. Under the scenario with network coverage, if spectrum resources of a macro network side are used in the D2D communication, the resources used by the D2D communication should be managed and controlled on the network side. In prior art, two modes of allocating time-frequency resource used in the D2D communication are already provided for the scenario with network coverage. One is the D2D communication based on direct scheduling (hereinafter referred to as mode A). Specifically, a UE (User Equipment) is in a connected state, and a base station instructs, by signaling, a transmitter when and in which resource block the UE performs data transmission, such a resource allocation being based on each UE. The other is the D2D communication based on shared resources (hereinafter referred to as mode B). The primary concept thereof is that UEs in one cell shares a time-frequency resource pool broadcasted by a base station and performs the D2D communication. The foregoing two allocation modes have their own advantages and disadvantages, respectively, and both are actually necessary solutions.

Currently, when the 3GPP discusses the D2D communication solution based on direct scheduling, there is a following problem: when the macro network coverage where the UE is located is poor, the UE which is in a connected state and communicates under the mode A may not obtain resources of the mode A from a base station for a certain period. If the UE still need to use the resources of the mode A during this period, the D2D communication may not be performed, resulting in interruption of the D2D communication.

Therefore, how to effectively reduce likelihood of the interruption of the D2D communication and guarantee continuity of D2D communication service is a problem to be solved.

DETAILED DESCRIPTION

The present disclosure is further described in detail hereinafter with reference to the accompanying drawings and implementations, in order to more fully understand the above-mentioned purposes, features and advantages of the present disclosure. It should be noted that, when not conflicting, the implementations of the present application and features in the implementations could be combined mutually.

Figure 1:
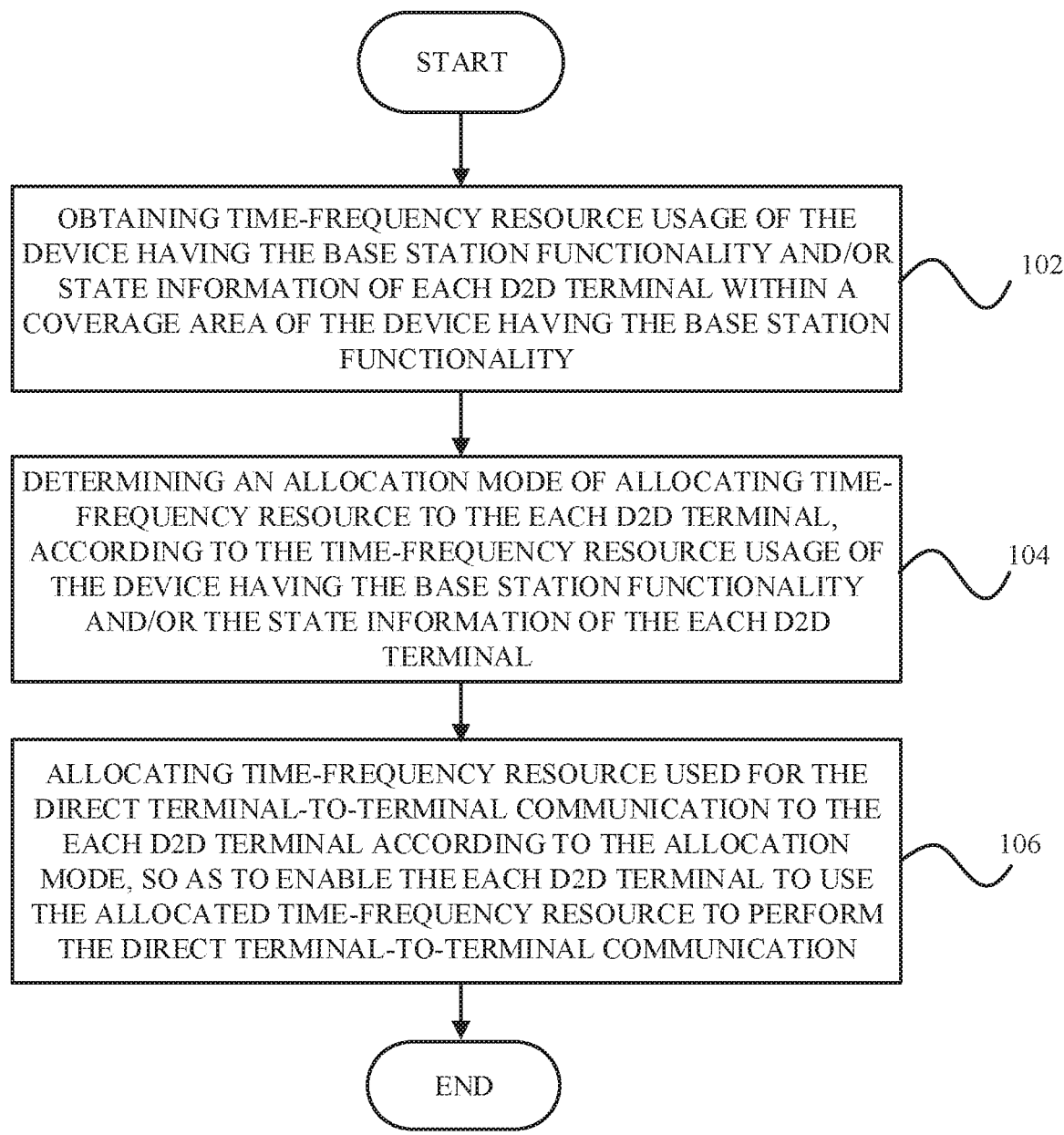
FIG. 1 shows a schematic flowchart of a resource allocation method used for direct terminal-to-terminal communication and suitable for use in a device having base station functionality according to an implementation of the present disclosure.

A lot of details are set forth below so as to fully understand the present disclosure, however, the present disclosure may also be implemented by adopting other implementations different from those as described herein, and therefore, the protection scope of the present disclosure is not limited by the implementations disclosed below FIG. 1 shows a schematic flowchart of a resource allocation method used for direct terminal-to-terminal communication and suitable for use in a device having base station functionality according to an implementation of the present disclosure.

As illustrated in FIG. 1, a resource allocation method used for direct terminal-to-terminal communication and suitable for use in a device having base station functionality according to an implementation of the present disclosure, includes: a step 102 of obtaining time-frequency resource usage of the device having the base station functionality and/or state information of each D2D terminal within a coverage area of the device having the base station functionality; a step 104 of determining an allocation mode of allocating time-frequency resource to the each D2D terminal, according to the time-frequency resource usage of the device having the base station functionality and/or the state information of the each D2D terminal; and a step 106 of allocating time-frequency resource used for the direct terminal-to-terminal communication to the each D2D terminal according to the allocation mode, so as to enable the each D2D terminal to use the allocated time-frequency resource to perform the direct terminal-to-terminal communication.

In this technical solution, by means of determining the allocation mode of allocating the time-frequency resource to the each D2D terminal, according to the state information of the each D2D terminal within the coverage area of the device having the base station functionality, it is possible to determine to adopt an allocation mode of pre-distributing a time-frequency resource pool (i.e., the foregoing mode B) when it is determined, according to the state information of the D2D terminal, that quality of communication with the D2D terminal is low (for example, the D2D terminal has moved to an edge of a cell). The D2D terminals may be wirelessly disconnected from the device having the base station functionality for a short time when using the resource of the mode B to transmit data to each other, and this does not mean that D2D transmission should be stopped. Thus, the likelihood of the interruption of the D2D communication can be effectively reduced, the continuity of the D2D communication service can be guaranteed.

By means of determining the allocation mode of allocating the time-frequency resource to the each D2D terminal, according to the time-frequency resource usage of the device having the base station functionality, the allocation mode of allocating the time-frequency resource to the D2D terminal can be determined flexibly, according to the amount of time-frequency resource capable of being currently used for the D2D communication, of the device having the base station functionality. For example, when the amount of the time-frequency resource which can be used for the D2D communication is large, an allocation mode of directly scheduling the each D2D terminal is adopted, so as to ensure high quality of communication when the each D2D terminal performs the D2D communication.

Naturally, when the device having the base station functionality determines the allocation mode of allocating the time-frequency resource to the D2D terminal, the foregoing two aspects can be considered comprehensively, so as to ensure that the D2D communication has high quality, when the continuity of the D2D communication service is guaranteed.

Persons skilled in the art should understand that the device having the base station functionality according to the present disclosure includes a macro base station, a microcell base station (such as a smart phone) realized by a communication device, and so forth.

In one implementation of the present disclosure, determining the allocation mode according to the time-frequency resource usage of the device having the base station functionality includes: judging whether the amount of the time-frequency resource suitable for use in the direct terminal-to-terminal communication in the time-frequency resource which is used for transmitting uplink data and can be scheduled by the device having the base station functionality is larger than or equal to a predetermined amount; and determining to adopt an time-frequency resource allocation mode of directly scheduling the each D2D terminal when judging that the amount of the time-frequency resource suitable for use in the direct terminal-to-terminal communication is larger than or equal to the predetermined amount.

As described above, by means of adopting the allocation mode of directly scheduling the each D2D terminal when judging that the amount of the time-frequency resource suitable for use in the D2D communication is large, the high quality of the communication can be ensured when the each D2D terminal performs the D2D communication.

In another implementation of the present disclosure, determining the allocation mode of allocating the time-frequency resource to the each D2D terminal according to the state information of the each D2D terminal includes: judging whether the each D2D terminal is located at the edge of the coverage area of the device having the base station functionality, according to location information of the each D2D terminal; and determining to adopt an allocation mode of pre-distributing a time-frequency resource pool to allocate the time-frequency resource to any one D2D terminal, when judging that the any one D2D terminal is located at the edge of the coverage area of the device having the base station functionality.

In this implementation, when determining that the D2D terminal is located at the edge of the coverage area of the device having the base station functionality, the quality of the communication between the D2D terminal and the device having the base station functionality may be low. However, by means of adopting the allocation mode of pre-distributing the time-frequency resource pool, the problem of the interruption of the D2D communication due to adopting the allocation mode of directly scheduling (i.e., mode A) when the quality of the communication between the D2D terminal and the device having the base station functionality is low can be avoided.

In the above-mentioned technical solution, allocating the time-frequency resource used for the direct terminal-to-terminal communication to the any one D2D terminal according to the allocation mode of pre-distributing the time-frequency resource pool includes: predicting a target cell which the any one D2D terminal is about to enter, according to motion state of the any one D2D terminal; based on a first time-frequency resource pool used for the direct terminal-to-terminal communication and allocated by the device having the base station functionality and a second time-frequency resource pool used for the direct terminal-to-terminal communication and allocated by the device having the base station functionality in the target cell, selecting common time-frequency resource in the first time-frequency resource pool and the second time-frequency resource pool as time-frequency resource in the pre-distributed time-frequency resource pool; and notifying the pre-distributed time-frequency resource pool to the any one D2D terminal, so as to enable the any one D2D terminal to select the time-frequency resource used for the direct terminal-to-terminal communication from the pre-distributed time-frequency resource pool.

In this technical solution, by means of selecting the common time-frequency resource in the first time-frequency resource pool and the second time-frequency resource pool as the time-frequency resource in the pre-distributed time-frequency resource pool when determining that the D2D terminal is about to enter another cell (i.e., the target cell), the D2D terminal can perform the D2D communication based on the common time-frequency resource used for the direct terminal-to-terminal communication and allocated by two cells when moving from one cell to the other cell, and in turn, the continuity of the D2D communication service can be ensured when the D2D terminal switches between the cells.

In the above-mentioned technical solution, the method further includes: judging whether the each D2D terminal moves to the center of the coverage area of the device having the base station functionality, according to the motion state of the each D2D terminal; and switching from the allocation mode of pre-distributing the time-frequency resource pool to the time-frequency resource allocation mode of directly scheduling the each D2D terminal, when judging that the any one D2D terminal moves to the center of the coverage area of the device having the base station functionality.

In this technical solution, by means of switching from the allocation mode of pre-distributing the time-frequency resource pool to the time-frequency resource allocation mode of directly scheduling the each D2D terminal, i.e., switching from the mode B to the mode A, when determining that the D2D terminal moves from the edge of the cell to the center of the cell, the time-frequency resource allocation mode of directly scheduling the D2D terminal can be adopted when the quality of the communication with the D2D terminal is high (compared with the quality of the communication when the D2D terminal is at the edge of the cell), so as to ensure the high quality of the communication when the D2D terminal performs the D2D communication.

In the above-mentioned technical solution, the method further includes: switching from the currently adopted allocation mode of allocating the time-frequency resource used for the direct terminal-to-terminal communication to the each D2D terminal to a designated allocation mode when receiving a command which requests the designated allocation mode and is transmitted by the each D2D terminal.

In this technical solution, the D2D terminal can also directly notify the allocation mode of allocating the time-frequency resource used for the D2D communication to the D2D terminal, to the device having the base station functionality. Specifically, for example, the D2D terminal can actively request the allocation mode of the device having the base station functionality allocating the time-frequency resource to the D2D terminal, according to information, such as importance of the D2D communication performed by the D2D terminal, so as to ensure that the allocation mode of the device having the base station functionality allocating the time-frequency resource to the D2D terminal can better meet actual requirements of the D2D terminal.

In the above-mentioned technical solution, the method further includes: notifying an abnormal time-frequency resource pool distributed by the device having the base station functionality to the each D2D terminal, so as to enable the each D2D terminal to select the time-frequency resource used for resuming interrupted direct terminal-to-terminal communication from the abnormal time-frequency resource pool when being wirelessly disconnected from the device having the base station functionality.

In this technical solution, by means of notifying the abnormal time-frequency resource pool to the each D2D terminal, the continuity of the D2D communication can be maintained with the time-frequency resource in the abnormal time-frequency resource pool when the communication between the D2D terminal and the device having the base station functionality is abnormal and does not switching to the allocation mode of pre-distributing the time-frequency resource pool (for example, the communication is abnormal when switching from the mode A to the mode B). It should be noted that, the D2D terminal can select from an abnormal time-frequency resource pool notified by the device having the base station functionality in a current cell or can select from an abnormal time-frequency resource pool notified by the device having the base station functionality in an adjacent cell, when selecting the time-frequency resource used for resuming the interrupted direct terminal-to-terminal communication from the abnormal time-frequency resource pool.

In the above-mentioned technical solution, the method further includes: distributing the abnormal time-frequency resource pool according to importance of D2D service processed by the each D2D terminal and priority of the D2D service.

In the above-mentioned technical solution, the method further includes: adjusting the amount of the time-frequency resource in the abnormal time-frequency resource pool according to resumption of the interrupted direct terminal-to-terminal communication after the each D2D terminal is wirelessly disconnected from the device having the base station functionality.

In this technical solution, by means of adjusting the amount of the time-frequency resource in the abnormal time-frequency resource pool according to the resumption of the D2D communication, the amount of the time-frequency resource in the abnormal time-frequency resource pool can be reduced when the interrupted D2D communication is greatly resumed, so as to ensure maximum usage of the time-frequency resource.

In the above-mentioned technical solution, the method further includes: receiving signaling relating to wireless link resuming process so as to determine the resumption of the interrupted direct terminal-to-terminal communication according to the signaling relating to the wireless link resuming process; and/or receiving the resumption of the interrupted direct terminal-to-terminal communication reported by the each D2D terminal.

In other words, on one hand, the device having the base station functionality can determine the resumption of the interrupted D2D communication according to the signaling received during the wireless link resuming process; on the other hand, in order to reduce analysis load of the device having the base station functionality, the device having the base station functionality can merely receive the resumption of the interrupted direct terminal-to-terminal communication reported by the D2D terminal.

In the above-mentioned technical solution, the method further includes: adjusting the amount of the time-frequency resource under the each allocation mode according to the number of D2D terminals to be scheduled.

In this technical solution, specifically, when the number of the D2D terminals to be scheduled is large, in order to reduce load of the device having the base station functionality, many D2D terminals can be scheduled to enable the mode B to select the time-frequency resource, thereby increasing the amount of the time-frequency resource under the mode B; when the number of the D2D terminals to be scheduled is small, in order to improve the quality of the D2D communication, many D2D terminals can be scheduled to enable the mode A to select the time-frequency resource, thereby increasing the amount of the time-frequency resource under the mode A.

Figure 2:
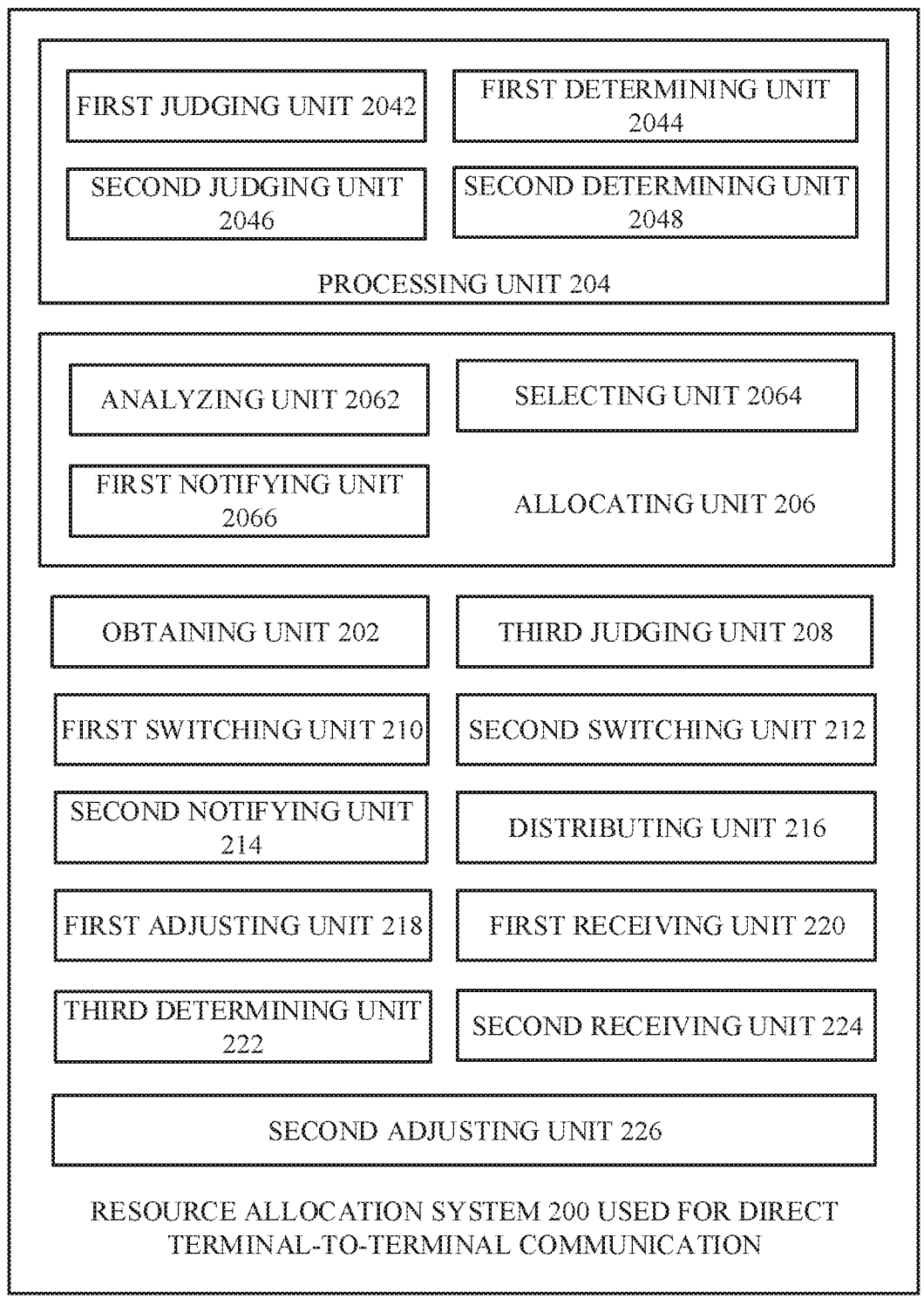
FIG. 2 shows a schematic block diagram of a resource allocation system used for direct terminal-to-terminal communication and suitable for use in a device having base station functionality, according to an implementation of the present disclosure.

FIG. 2 shows a schematic block diagram of a resource allocation system used for direct terminal-to-terminal communication and suitable for use in a device having base station functionality according to an implementation of the present disclosure.

As illustrated in FIG. 2, a resource allocation system 200 used for direct terminal-to-terminal communication and suitable for use in a device having base station functionality according to an implementation of the present disclosure, includes: an obtaining unit 202 configured for obtaining time-frequency resource usage of the device having the base station functionality and/or state information of each D2D terminal within a coverage area of the device having the base station functionality; a processing unit 204 configured for determining an allocation mode of allocating time-frequency resource to the each D2D terminal, according to the time-frequency resource usage of the device having the base station functionality and/or the state information of the each D2D terminal; and an allocating unit 206 configured for allocating time-frequency resource used for the direct terminal-to-terminal communication to the each D2D terminal according to the allocation mode, so as to enable the each D2D terminal to use the allocated time-frequency resource to perform the direct terminal-to-terminal communication.

In this technical solution, by means of determining the allocation mode of allocating the time-frequency resource to the each D2D terminal, according to the state information of the each D2D terminal within the coverage area of the device having the base station functionality, it is possible to determine to adopt an allocation mode of pre-distributing a time-frequency resource pool (i.e., the foregoing mode B) when it is determined, according to the state information of the D2D terminal, that quality of communication with the D2D terminal is low (for example, the D2D terminal has moved to an edge of a cell). The D2D terminals may be wirelessly disconnected from the device having the base station functionality for a short time when using the resource of the mode B to transmit data to each other, and this does not mean that D2D transmission should be stopped. Thus, the likelihood of the interruption of the D2D communication can be effectively reduced, the continuity of the D2D communication service can be guaranteed.

By means of determining the allocation mode of allocating the time-frequency resource to the each D2D terminal, according to the time-frequency resource usage of the device having the base station functionality, the allocation mode of allocating the time-frequency resource to the D2D terminal can be determined flexibly, according to the amount of time-frequency resource capable of being currently used for the D2D communication of the device having the base station functionality. For example, when the amount of the time-frequency resource which can be used for the D2D communication is large, an allocation mode of directly scheduling the each D2D terminal is adopted, so as to ensure high quality of communication when the each D2D terminal performs the D2D communication.

Naturally, when the device having the base station functionality determines the allocation mode of allocating the time-frequency resource to the D2D terminal, the foregoing two aspects can be considered comprehensively, so as to ensure that the D2D communication has high quality, when the continuity of the D2D communication service is guaranteed.

Persons skilled in the art should understand that the device having the base station functionality according to the present disclosure includes a macro base station, a microcell base station (such as a smart phone) realized by a communication device, and so forth.

In one implementation of the present disclosure, the processing unit 204 includes: a first judging unit 2042 configured for judging whether the amount of the time-frequency resource suitable for use in the direct terminal-to-terminal communication in the time-frequency resource which is used for transmitting uplink data and can be scheduled by the device having the base station functionality is larger than or equal to a predetermined amount; and a first determining unit 2044 configured for determining to adopt an time-frequency resource allocation mode of directly scheduling the each D2D terminal when the first judging unit 2042 judges that the amount of the time-frequency resource suitable for use in the direct terminal-to-terminal communication is larger than or equal to the predetermined amount.

As described above, by means of adopting the allocation mode of directly scheduling the each D2D terminal when judging that the amount of the time-frequency resource suitable for use in the D2D communication is large, the high quality of the communication can be ensured when the each D2D terminal performs the D2D communication.

In another implementation of the present disclosure, the processing unit 204 includes: a second judging unit 2046 configured for judging whether the each D2D terminal is located at the edge of the coverage area of the device having the base station functionality, according to location information of the each D2D terminal; and a second determining unit 2048 configured for determining to adopt an allocation mode of pre-distributing a time-frequency resource pool to allocate the time-frequency resource to any one D2D terminal, when the second judging unit 2046 judges that the any one D2D terminal is located at the edge of the coverage area of the device having the base station functionality.

In this implementation, when determining that the D2D terminal is located at the edge of the coverage area of the device having the base station functionality, the quality of the communication between the D2D terminal and the device having the base station functionality may be low. However, by means of adopting the allocation mode of pre-distributing, the time-frequency resource pool, the problem of the interruption of the D2D communication due to adopting the allocation mode of directly scheduling (i.e., mode A) when the quality of the communication between the D2D terminal and the device having the base station functionality is low can be avoided.

In the above-mentioned technical solution, the allocating unit 206 includes: an analyzing unit 2062 configured for predicting a target cell which the any one D2D terminal is about to enter, according to motion state of the any one D2D terminal; a selecting unit 2064 configured for, based on a first time-frequency resource pool used for the direct terminal-to-terminal communication and allocated by the device having the base station functionality and a second time-frequency resource pool used for the direct terminal-to-terminal communication and allocated by the device having the base station functionality in the target cell, selecting common time-frequency resource in the first time-frequency resource pool and the second time-frequency resource pool as time-frequency resource in the pre-distributed time-frequency resource pool; a first notifying unit 2066 configured for notifying the pre-distributed time-frequency resource pool to the any one D2D terminal, so as to enable the any one D2D terminal to select the time-frequency resource used for the direct terminal-to-terminal communication from the pre-distributed time-frequency resource pool.

In this technical solution, by means of selecting the common time-frequency resource in the first time-frequency resource pool and the second time-frequency resource pool as the time-frequency resource in the pre-distributed time-frequency resource pool when determining that the D2D terminal is about to enter another cell (i.e., the target cell), the D2D terminal can perform the D2D communication based on the common time-frequency resource used for the direct terminal-to-terminal communication and al located by two cells when moving from one cell to the other cell, and in turn, the continuity of the D2D communication service can be ensured when the D2D terminal switches between the cells.

In the above-mentioned technical solution, the system further includes: a third judging unit 208 configured for judging whether the each D2D terminal moves to the center of the coverage area of the device having the base station functionality, according to the motion state of the each D2D terminal; and a first switching unit 210 configured for switching from the allocation mode of pre-distributing the time-frequency resource pool to the time-frequency resource allocation mode of directly scheduling the each D2D terminal, when the third judging unit 208 judges that the any one D2D terminal moves to the center of the coverage area of the device having the base station functionality.

In this technical solution, by means of switching from the allocation mode of pre-distributing the time-frequency resource pool to the time-frequency resource allocation mode of directly scheduling the each D2D terminal, i.e., switching from the mode B to the mode A, when determining that the D2D terminal moves from the edge of the cell to the center of the cell, the time-frequency resource allocation mode of directly scheduling the D2D terminal can be adopted when the quality of the communication with the D2D terminal is high (compared with the quality of the communication when the D2D terminal is at the edge of the cell), so as to ensure the high quality of the communication when the D2D terminal performs the D2D communication.

In the above-mentioned technical solution, the system further includes: a second switching 212 unit configured for switching from the currently adopted allocation mode of allocating the time-frequency resource used for the direct terminal-to-terminal communication to the each D2D terminal to a designated allocation mode when receiving a command which requests the designated allocation mode and is transmitted by the each D2D terminal.

In this technical solution, the D2D terminal can also directly notify the allocation mode of allocating the time-frequency resource used for the D2D communication to the D2D terminal, to the device having the base station functionality. Specifically, for example, the D2D terminal can actively request the allocation mode of the device having the base station functionality allocating the time-frequency resource to the D2D terminal, according to information, such as importance of the D2D communication performed by the D2D terminal, so as to ensure that the allocation mode of the device having the base station functionality allocating the time-frequency resource to the D2D terminal can better meet actual requirements of the D2D terminal.

In the above-mentioned technical solution, the system further includes: a second notifying unit 214 configured for notifying an abnormal time-frequency resource pool distributed by the device having the base station functionality to the each D2D terminal, so as to enable the each D2D terminal to select the time-frequency resource used for resuming interrupted direct terminal-to-terminal communication from the abnormal time-frequency resource pool when being wirelessly disconnected from the device having the base station functionality.

In this technical solution, by means of notifying the abnormal time-frequency resource pool to the each D2D terminal, the continuity of the D2D communication can be maintained with the time-frequency resource in the abnormal time-frequency resource pool when the communication between the D2D terminal and the device having the base station functionality is abnormal and does not switching to the allocation mode of pre-distributing the time-frequency resource pool (for example, the communication is abnormal when switching from the mode A to the mode B). It should be noted that, the D2D terminal can select from an abnormal time-frequency resource pool notified by the device having the base station functionality in a current cell or can select from an abnormal time-frequency resource pool notified by the device having the base station functionality in an adjacent cell, when selecting the time-frequency resource used for resuming the interrupted direct terminal-to-terminal communication from the abnormal time-frequency resource pool.

In the above-mentioned technical solution, the system further includes: a distributing unit 216 configured for distributing the abnormal time-frequency resource pool according to importance of D2D service processed by the each D2D terminal and priority of the D2D service.

In the above-mentioned technical solution, the system further includes: a first adjusting unit 218 configured for adjusting the amount of the time-frequency resource in the abnormal time-frequency resource pool according to resumption of the interrupted direct terminal-to-terminal communication after the each D2D terminal is wirelessly disconnected from the device having the base station functionality.

In this technical solution, by means of adjusting the amount of the time-frequency resource in the abnormal time-frequency resource pool according to the resumption of the D2D communication, the amount of the time-frequency resource in the abnormal time-frequency resource pool can be reduced when the interrupted D2D communication is greatly resumed, so as to ensure maximum usage of the time-frequency resource.

In the above-mentioned technical solution, the system further includes: a first receiving unit 220 configured for receiving signaling relating to wireless link resuming process; a third determining unit 222 configured for determining the resumption of the interrupted direct terminal-to-terminal communication according to the signaling relating to the wireless link resuming process; and/or a second receiving unit 224 configured for receiving the resumption of the interrupted direct terminal-to-terminal communication reported by the each D2D terminal.

In other words, on one hand, the device having the base station functionality can determine the resumption of the interrupted D2D communication according to the signaling received during the wireless link resuming process; in addition, in order to reduce analysis load of the device having the base station functionality, the device having the base station functionality can merely receive the resumption of the interrupted direct terminal-to-terminal communication reported by the D2D terminal.

In the above-mentioned technical solution, the system further includes: a second adjusting unit 226 configured for adjusting the amount of the time-frequency resource under the each allocation mode according to the number of D2D terminals to be scheduled.

In this technical solution, specifically, when the number of the D2D terminals to be scheduled is large, in order to reduce load of the device having the base station functionality, many D2D terminals can be scheduled to enable the mode B to select the time-frequency resource, thereby increasing the amount of the time-frequency resource under the mode B; when the number of the D2D terminals to be scheduled is small, in order to improve the quality of the D2D communication, many D2D terminals can be scheduled to enable the mode A to select the time-frequency resource, thereby increasing the amount of the time-frequency resource under the mode A.

The present disclosure further provides a device having the base station functionality (not illustrated) and including the resource allocation system 200 used for the direct terminal-to-terminal communication as illustrated in FIG. 2.

Figure 3:
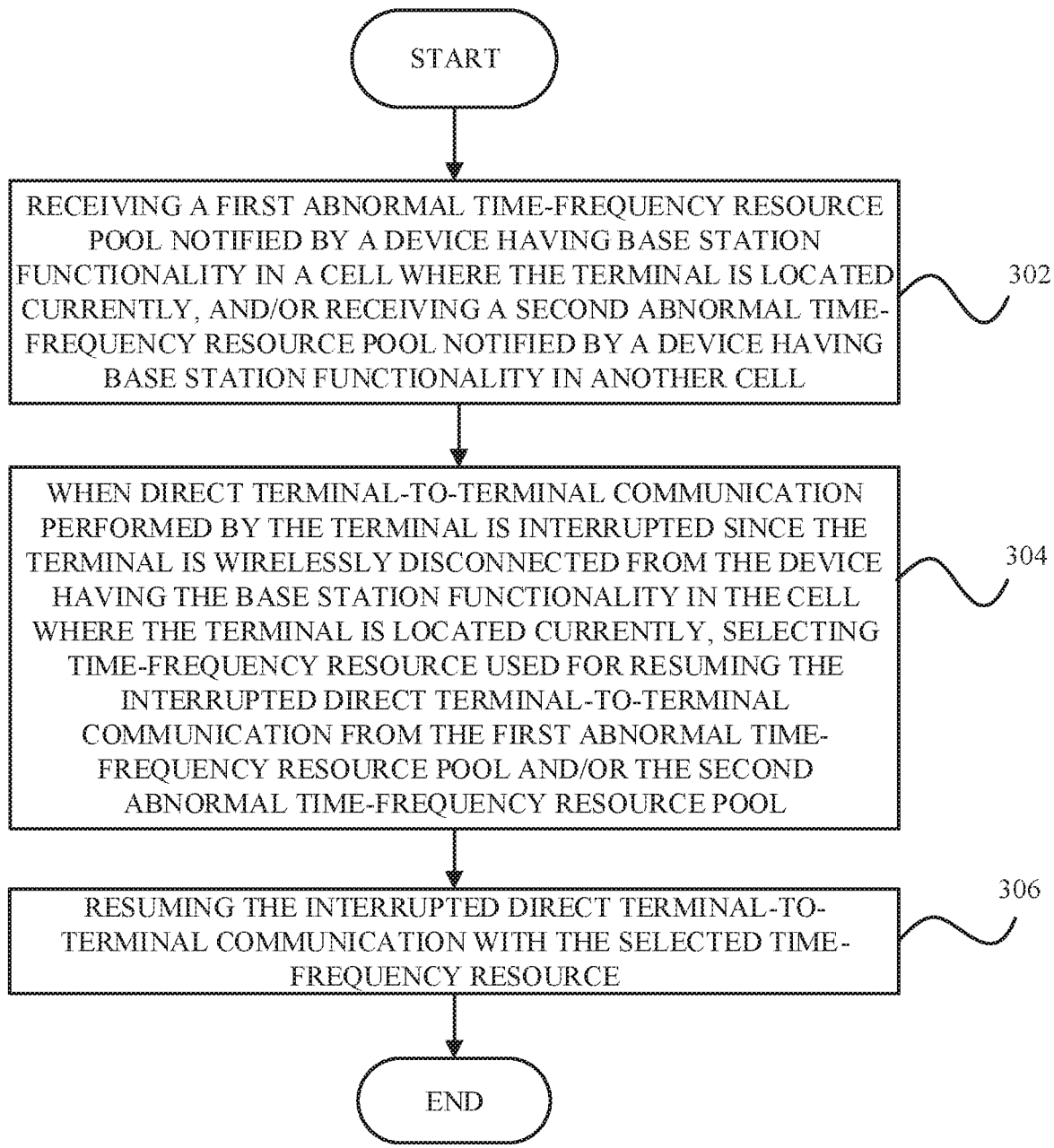
FIG. 3 shows a schematic flowchart of a resource allocation method used for direct terminal-to-terminal communication and suitable for use in a terminal according to an implementation of the present disclosure.

FIG. 3 shows a schematic flowchart of a resource allocation method used for direct terminal-to-terminal communication and suitable for use in a terminal according to an implementation of the present disclosure.

As illustrated in FIG. 3, a resource allocation method used for direct terminal-to-terminal communication and suitable for use in a terminal according to an implementation of the present disclosure, includes: a step 302 of receiving a first abnormal time-frequency resource pool notified by a device having base station functionality in a cell where the terminal is located currently, and/or receiving a second abnormal time-frequency resource pool notified by a device having base station functionality in another cell; a step 304 of, when direct terminal-to-terminal communication performed by the terminal is interrupted since the terminal is wirelessly disconnected from the device having the base station functionality in the cell where the terminal is located currently, selecting time-frequency resource used for resuming the interrupted direct terminal-to-terminal communication from the first abnormal time-frequency resource pool and/or the second abnormal time-frequency resource pool; and a step 306 of resuming the interrupted direct terminal-to-terminal communication with the selected time-frequency resource.

In this technical solution, when the direct terminal-to-terminal communication performed by the terminal is interrupted since the terminal is wirelessly disconnected from the device having the base station functionality in the cell where the terminal is located currently, the time-frequency resource used for resuming the interrupted direct terminal-to-terminal communication may be selected from the first abnormal time-frequency resource pool notified before by the device having the base station functionality in the cell where the terminal is located currently; or the time-frequency resource used for resuming the interrupted direct terminal-to-terminal communication may be selected from the second abnormal time-frequency resource pool when receiving the second abnormal time-frequency resource pool notified by another cell (for example, a cell adjacent to the current cell); or the time-frequency resource may be selected from both the first abnormal time-frequency resource pool and the second abnormal time-frequency resource pool, so as to ensure that the interrupted direct terminal-to-terminal communication can be quickly resumed, and guarantee the continuity of the direct terminal-to-terminal communication.

Figure 4:
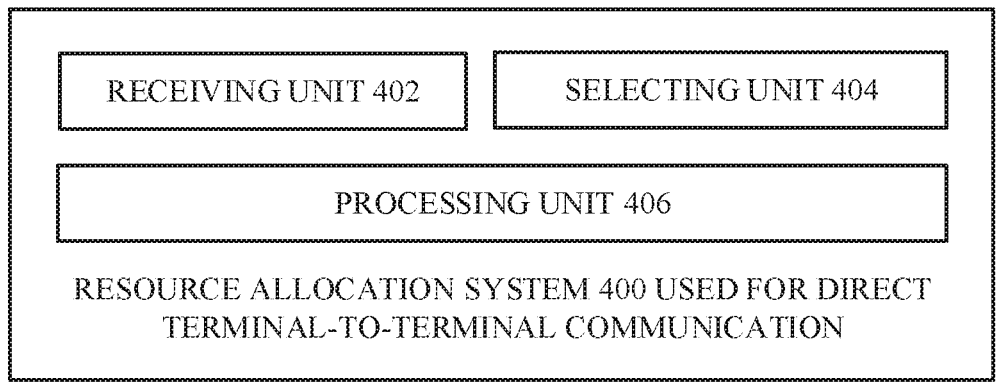
FIG. 4 shows a schematic block diagram of a resource allocation system used for direct terminal-to-terminal communication and suitable for use in a terminal according to an implementation of the present disclosure.

FIG. 4 shows a schematic block diagram of a resource allocation system used for direct terminal-to-terminal communication and suitable for use in a terminal according to an implementation of the present disclosure, As illustrated in FIG. 4, a resource allocation system 400 used for direct terminal-to-terminal communication and suitable for use in a terminal according to an implementation of the present disclosure, includes: a receiving unit 402 configured for receiving a first abnormal time-frequency resource pool notified by a device having base station functionality in a cell where the terminal is located currently and/or receiving a second abnormal time-frequency resource pool notified by a device having base station functionality in another cell; a selecting unit 404 configured for, when direct terminal-to-terminal communication performed by the terminal is interrupted since the terminal is wirelessly disconnected from the device having the base station functionality in the cell where the terminal is located currently, selecting time-frequency resource used for resuming the interrupted direct terminal-to-terminal communication from the first abnormal time-frequency resource pool and/or the second abnormal time-frequency resource pool; and a processing unit 406 configured for resuming the interrupted direct terminal-to-terminal communication with the time-frequency resource selected by the selecting unit 404.

In this technical solution, when the direct terminal-to-terminal communication performed by the terminal is interrupted since the terminal is wirelessly disconnected from the device having the base station functionality in the cell where the terminal is located currently, the time-frequency resource used for resuming the interrupted direct terminal-to-terminal communication may be selected from the first abnormal time-frequency resource pool notified before by the device having the base station functionality in the cell where the terminal is located currently; or the time-frequency resource used for resuming the interrupted direct terminal-to-terminal communication may be selected from the second abnormal time-frequency resource pool when receiving the second abnormal time-frequency resource pool notified by another cell (for example, a cell adjacent to the current cell); or the time-frequency resource may be selected from both the first abnormal time-frequency resource pool and the second abnormal time-frequency resource pool, so as to ensure that the interrupted direct terminal-to-terminal communication can be quickly resumed, and guarantee the continuity of the direct terminal-to-terminal communication.

The present disclosure further provides a terminal (not illustrated) including the resource allocation system 400 used for the direct terminal-to-terminal communication as illustrated in FIG. 4.

Specifically, the technical problem to be solved by the present disclosure is to reduce the interruption of the D2D communication process, thereby reducing impact on the service layer, especially reducing the interruption and guarantying the continuity of the service as far as possible when the D2D communication is used for public security, having great significance.

The method of reducing the interruption of the D2D service proposed by the present disclosure is mainly described hereinafter.

Firstly, the base station (for convenience of description, a device having base station functionality is taken for example and set forth, persons skilled in the art should understand that the device having the base station functionality may be any one of the devices having the base station functionality) flexibly selects a mode of D2D communication according to characteristics and other information (for example, location at the edge or in the center of a cell, resource allocation of an adjacent cell, etc.) of a UE. Specifically, when much of uplink resource of the base station can be used for the D2D communication, the mode A may be adopted to schedule the UE located in the center of the cell; when the UE moves and approaches the edge of the cell, the base station can change the resource allocation mode for the UE into the mode B.

Secondly, when the D2D UE is located at the edge of the current cell, the base station in the current cell can interact with a base station in an adjacent cell, and obtain resource allocation information of mode B of the adjacent cell. In turn, when it is judged that the D2D UE is about to move into the adjacent cell, the common part of the resource of the mode B of the current cell and the adjacent cell can be allocated to the D2D UE as much as possible, and the D2D UE can be notified to communicate under the mode B.

When the UE returns to the center of the current cell, in one implementation of the present disclosure, the base station can configure the UE to communicate under the mode A again; in another implementation of the present disclosure, the UE can also instruct the base station to allocate resource to it, so as to perform the D2D communication under the mode A again.

Thirdly, when there is a failure in a wireless link between the base station and the D2D UE which is not switched to the mode B, the UE can communicate under the mode B. A resource pool used under the mode B (for convenience of distinguishing, a specific resource pool is taken for example and described hereinafter) can be the resource of the mode B shared by multiple UEs within one cell model, or may be the resource of the mode B shared by multiple cells. The specific resource pool can also be a part of the resource pool of the mode B merely used for resuming the interrupted D2D communication.

The specific resource pool can be allocated by the base station. The basis on which the base station allocates the specific resource pool can include but not limited to information of the UE. The information includes the importance or priority of the D2D service can currently be processed by the UE.

In addition, the base station can adjust the amount of the time-frequency resource in the specific resource pool according to a statistical result of the resumed D2D communication. The statistical process may be implicitly or explicitly reported by the UE. The implicit report herein relies on inference of the UE. For example, the base station can infer occurrence of operation of resuming the D2D communication from signaling received during a complete wireless link resuming process and D2D communication state prior to resuming the wireless link. The explicit report is for reducing signaling analyzing load of the base station, i.e., the UE directly reports to the base station.

It is should be noted that, the D2D terminal can select from a specific resource pool notified by a base station in a current cell or can select from a specific resource pool notified by a base station in an adjacent cell, when selecting the time-frequency resource used for resuming the interrupted direct terminal-to-terminal communication from the specific resource pool.

Fourthly, the base station can adjust the amount of resource of the mode A and the mode B, according to the number of terminals currently capable of performing the D2D communication. Specifically, the allocation of resource by the base station can be based on information collected by the UE which includes information of frequency selected by the UE referring to current location and preferably used for the D2D communication, type of the D2D communication service (such as whether a large amount of data is produced), etc. The solution in which the base station adjusts the amount of resource of the mode A and the mode B according to the number of terminals currently supporting the D2D communication can also be applied to resource pool allocation during the D2D discovery process.

Figure 5:
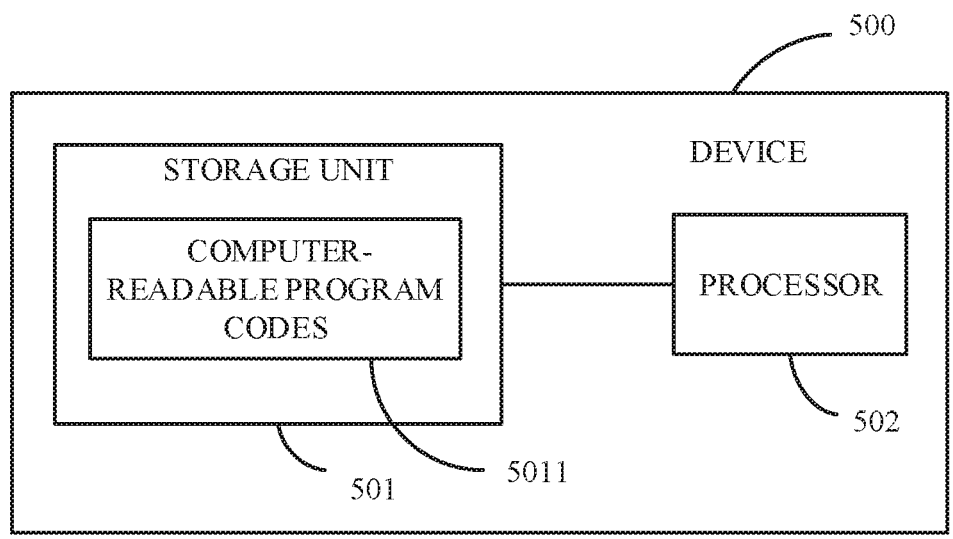
FIG. 5 is a schematic block diagram of a device having base station functionality according to an implementation of the present disclosure.

FIG. 5 shows a schematic block diagram of a device having base station functionality according to an implementation of the present disclosure.

As illustrated in FIG. 5, the device 500 includes a storage unit 501 and a processor 502. The storage unit 501 is electrically connected to the processor 502.

The storage unit 501 is configured for storing one or more computer-readable program codes 5011. The storage unit 501 can be a read only memory (ROM), a random access memory (RAM), a USB-disk, a removable hard disk, and so forth.

The processor 502 can include multiple cores for multi-thread or parallel processing and is configured to execute the one or more computer-readable program codes to: obtain time-frequency resource usage of the device having the base station functionality and/or state information of each D2D terminal within a coverage area of the device having the base station functionality; determine an allocation mode of allocating time-frequency resource to the each D2D terminal, according to the time-frequency resource usage of the device having the base station functionality and/or the state information of the each D2D terminal; and allocate time-frequency resource used for the direct terminal-to-terminal communication to the each D2D terminal according to the allocation mode, so as to enable the each D2D terminal to use the allocated time-frequency resource to perform the direct terminal-to-terminal communication.

In one implementation of the present disclosure, wherein determining the allocation mode according to the time-frequency resource usage of the device having the base station functionality, includes: judging whether the amount of the time-frequency resource suitable for use in the direct terminal-to-terminal communication in the time-frequency resource which is used for transmitting uplink data and can be scheduled by the device having the base station functionality is larger than or equal to a predetermined amount; and determining to adopt an time-frequency resource allocation mode of directly scheduling the each D2D terminal when judging that the amount of the time-frequency resource suitable for use in the direct terminal-to-terminal communication is larger than or equal to the predetermined amount.

In another implementation of the present disclosure, determining the allocation mode of allocating the time-frequency resource to the each D2D terminal according to the state information of the each D2D terminal, includes: judging whether the each D2D terminal is located at the edge of the coverage area of the device having the base station functionality according to location information of the each D2D terminal; and determining to adopt an allocation mode of pre-distributing a time-frequency resource pool to allocate the time-frequency resource to any one D2D terminal, when judging that the any one D2D terminal is located at the edge of the coverage area of the device having the base station functionality.

In the above-mentioned technical solution, allocating the time-frequency resource used for the direct terminal-to-terminal communication to the any one D2D terminal according to the allocation mode of pre-distributing the time-frequency resource pool, includes: predicting a target cell which the any one D2D terminal is about to enter, according to motion state of the any one D2D terminal; based on a first time-frequency resource pool used for the direct terminal-to-terminal communication and allocated by the device having the base station functionality and a second time-frequency resource pool used for the direct terminal-to-terminal communication and allocated by the device having the base station functionality in the target cell, selecting common time-frequency resource in the first time-frequency resource pool and the second time-frequency resource pool as time-frequency resource in the pre-distributed time-frequency resource pool; and notifying the pre-distributed time-frequency resource pool to the any one D2D terminal, so as to enable the any one D2D terminal to select the time-frequency resource used for the direct terminal-to-terminal communication from the pre-distributed time-frequency resource pool.

In the above-mentioned technical solution, the processor 502 is further configured to execute the one or more computer-readable program codes to: judge whether the each D2D terminal moves to the center of the coverage area of the device having the base station functionality, according to the motion state of the each D2D terminal; and switch from the allocation mode of pre-distributing the time-frequency resource pool to the time-frequency resource allocation mode of directly scheduling the each D2D terminal, when judging that the any one D2D terminal moves to the center of the coverage area of the device having the base station functionality.

In the above-mentioned technical solution, the processor 502 is further configured to execute the one or more computer-readable program codes to: switch from the currently adopted allocation mode of allocating the time-frequency resource used for the direct terminal-to-terminal communication to the each D2D terminal to a designated allocation mode when receiving a command which requests the designated allocation mode and is transmitted by the each D2D terminal.

In the above-mentioned technical solution, the processor 502 is further configured to execute the one or more computer-readable program codes to: notify an abnormal time-frequency resource pool distributed by the device having the base station functionality to the each D2D terminal, so as to enable the each D2D terminal to select the time-frequency resource used for resuming interrupted direct terminal-to-terminal communication from the abnormal time-frequency resource pool when being wirelessly disconnected from the device having the base station functionality.

In the above-mentioned technical solution, the processor 502 is further configured to execute the one or more computer-readable program codes to: distribute the abnormal time-frequency resource pool according to importance of D2D service processed by the each D2D terminal and priority of the D2D service; and/or adjust the amount of the time-frequency resource in the abnormal time-frequency resource pool according to resumption of the interrupted direct terminal-to-terminal communication after the each D2D terminal is wirelessly disconnected from the device having the base station functionality.

In the above-mentioned technical solution, the processor 502 is further configured to execute the one or more computer-readable program codes to: receive signaling relating to wireless link resuming process so as to determine the resumption of the interrupted direct terminal-to-terminal communication according to the signaling relating to the wireless link resuming process; and/or receive the resumption of the interrupted direct terminal-to-terminal communication reported by the each D2D terminal.

In the above-mentioned technical solution, the processor 502 is further configured to execute the one or more computer-readable program codes to: adjust the amount of the time-frequency resource under the each allocation mode according to the number of D2D terminals to be scheduled.

Figure 6:
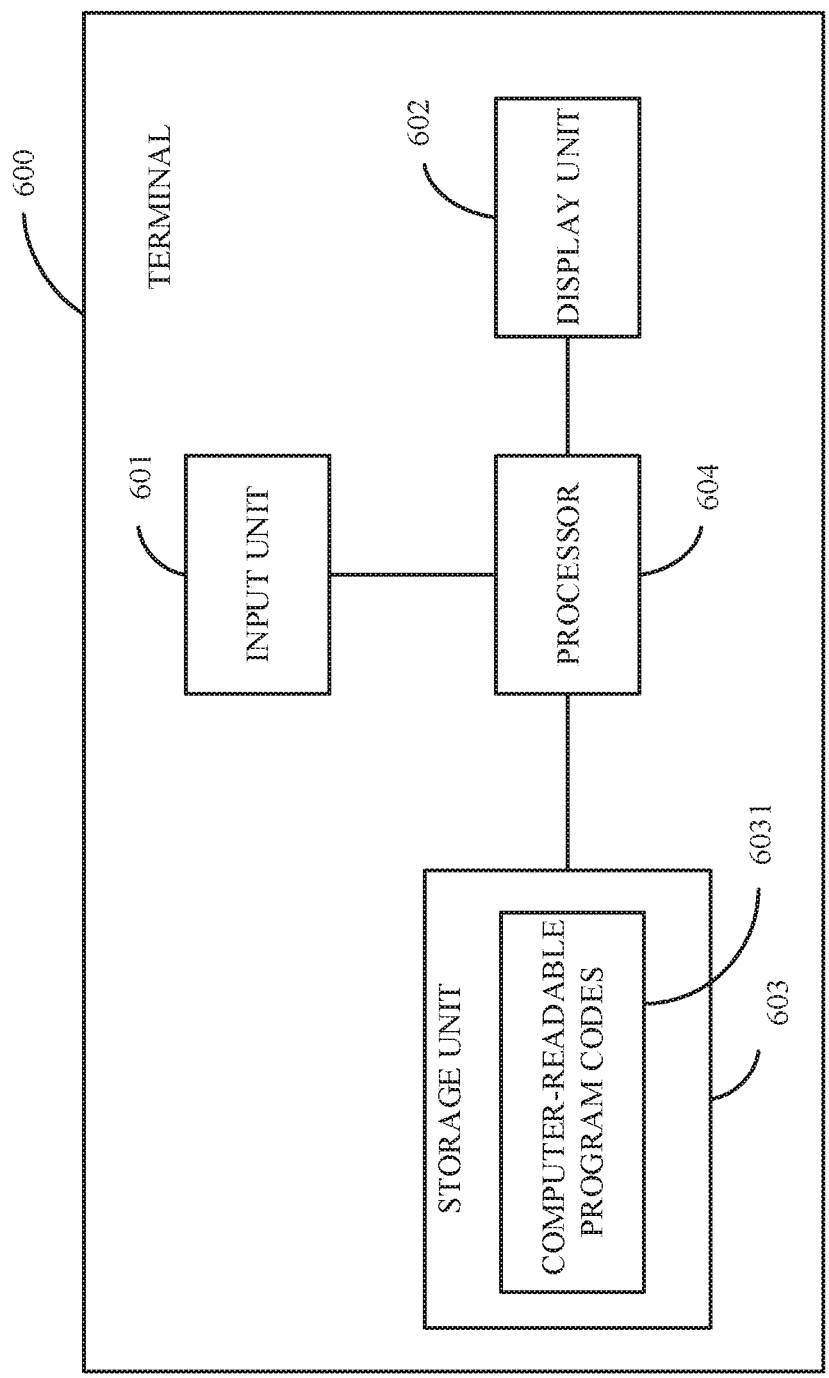
FIG. 6 is a schematic block diagram of a terminal according to an implementation of the present disclosure.

FIG. 6 shows a schematic block diagram of a terminal according to an implementation of the present disclosure.

As illustrated in FIG. 6, the server 600 includes: an input unit 601, a display unit 602, a storage unit 603, and a processor 604. The input unit 601, the display unit 602, and the storage unit 603 are electrically connected to the processor 604.

The input unit 601 is configured for inputting information, such as letters. The input unit 601 may be but not limited to a physical keyboard, a touch-screen, or a combination of the physical keyboard and the touch-screen.

The display unit 602 is configured for displaying visual information, such as texts, images. The display unit 602 may be an LED display screen.

The storage unit 603 is configured for storing one or more computer-readable program codes 6031. The storage unit 603 can be a read only memory (ROM), a random access memory (RAM), a USB-disk, a removable hard disk, and so forth.

The processor 604 can include multiple cores for multi-thread or parallel processing and is configured to execute the one or more computer-readable program codes to: receive a first abnormal time-frequency resource pool notified by a device having base station functionality in a cell where the terminal is located currently, and/or receiving a second abnormal time-frequency resource pool notified by a device having base station functionality in another cell; when direct terminal-to-terminal communication performed by the terminal is interrupted since the terminal is wirelessly disconnected from the device having the base station functionality in the cell where the terminal is located currently, select time-frequency resource used for resuming the interrupted direct terminal-to-terminal communication from the first abnormal time-frequency resource pool and/or the second abnormal time-frequency resource pool; and resume the interrupted direct terminal-to-terminal communication with the selected time-frequency resource.

The technical solution of the present disclosure can reduce the likelihood of the interruption of the D2D communication, avoid as far as possible the interruption of the D2D service due to problem in connection between the UE and the macro network due to the network coverage or other reasons, improve the capability to provide the D2D terminal with services of high quality and high reliability, and improve user experience of the D2D terminal.

The technical solution of the present disclosure is described in detail hereinbefore in conjunction with the accompanying drawings. The present disclosure proposes a novel resource allocation solution used for the direct terminal-to-terminal communication and suitable for use in the device having the base station functionality. The solution can effectively reduce the likelihood of the interruption of the D2D communication, guarantee the continuity of the D2D communication service, and also ensure the high quality of the communication when the D2D terminal performs the D2D communication.

The foregoing is merely the implementations of the present disclosure, and is not intended to limit the present disclosure. For persons skilled in the art, the present disclosure could have various modifications and variations. Any amendments, equivalent substitutions, improvements, etc., within the spirit and principle of the present disclosure should be included within the protection scope of the present disclosure.

What is claimed is:

1. A method of resource allocation for direct terminal-to-terminal communication in a device having base station functionality, comprising:
    obtaining at least one of time-frequency resource usage of the device having the base station functionality and state information of each D2D terminal within a coverage area of the device having the base station functionality;

determining an allocation mode of allocating time-frequency resource to the each D2D terminal, according to the at least one of the time-frequency resource usage of the device having the base station functionality and the state information of the each D2D terminal; and allocating time-frequency resource used for the direct terminal-to-terminal communication to the each D2D terminal according to the allocation mode to enable the each D2D terminal to use the allocated time-frequency resource to perform the direct terminal-to-terminal communication, wherein determining the allocation mode of allocating the time-frequency resource to the each D2D terminal according to the at least one of the time-frequency resource usage of the device having the base station functionality and the state information of the each D2D terminal comprises:

determining whether the each D2D terminal is located at an edge of the coverage area of the device having the base station functionality according to location information of the each D2D terminal; and when any D2D terminal is determined locating at the edge of the coverage area of the device having the base station functionality according to location information of the each D2D terminal, determining the allocation mode of allocating the time-frequency resource to the each D2D terminal according to the at least one of the time-frequency resource usage of the device having the base station functionality and the state information of the each D2D terminal further comprises at least one of:

predicting a target cell which the any D2D terminal is about to enter, according to a motion state of the any D2D terminal; and determining whether the any D2D terminal moves to the center of the coverage area of the device having the base station functionality, according to a motion state of the any D2D terminal.

2. The method of claim 1, wherein determining the allocation mode according to the at least one of the time-frequency resource usage of the device having the base station functionality and the state information of the each D2D terminal comprises:

determining whether an amount of the time-frequency resource suitable for use in the direct terminal-to-terminal communication in the time-frequency resource is larger than or equal to a predetermined amount, wherein the time-frequency resource is used for transmitting uplink data and is scheduled by the device having the base station functionality; and determining to adopt a time-frequency resource allocation mode of directly scheduling the each D2D terminal when determining that the amount of the time-frequency resource suitable for use in the direct terminal-to-terminal communication is larger than or equal to the predetermined amount.

3. The method of claim 2, further comprising:

switching from a currently adopted allocation mode of allocating the time-frequency resource used for the direct terminal-to-terminal communication to the each D2D terminal to a designated allocation mode when receiving a command which requests the designated allocation mode and is transmitted by the each D2D terminal.

4. The method of claim 1, wherein determining the allocation mode of allocating the time-frequency resource to the each D2D terminal according to the at least one of the time-frequency resource usage of the device having the base station functionality and the state information of the each D2D terminal further comprises:

determining to adopt an allocation mode of pre-distributing a time-frequency resource pool to allocate the time-frequency resource to any D2D terminal, when determining that the any D2D terminal is located at the edge of the coverage area of the device having the base station functionality.

5. The method of claim 4, wherein allocating the time-frequency resource used for the direct terminal-to-terminal communication to the any D2D terminal according to the allocation mode of pre-distributing the time-frequency resource pool comprises:

based on a first time-frequency resource pool used for the direct terminal-to-terminal communication and allocated by the device having the base station functionality and a second time-frequency resource pool used for the direct terminal-to-terminal communication and allocated by the device having the base station functionality in the target cell, selecting common time-frequency resource in the first time-frequency resource pool and the second time-frequency resource pool as time-frequency resource in the pre-distributed time-frequency resource pool; and notifying the pre-distributed time-frequency resource pool to the any D2D terminal to enable the any D2D terminal to select the time-frequency resource used for the direct terminal-to-terminal communication from the pre-distributed time-frequency resource pool.

6. The method of claim 4, further comprising:

switching from the allocation mode of pre-distributing the time-frequency resource pool to a time-frequency resource allocation mode of directly scheduling the each D2D terminal, when determining that the any D2D terminal moves to the center of the coverage area of the device having the base station functionality.

7. The method of claim 1, further comprising:

notifying an abnormal time-frequency resource pool distributed by the device having the base station functionality to the each D2D terminal to enable the each D2D terminal to select the time-frequency resource used for resuming interrupted direct terminal-to-terminal communication from the abnormal time-frequency resource pool when being wirelessly disconnected from the device having the base station functionality.

8. The method of claim 7, further comprising at least one of:

distributing the abnormal time-frequency resource pool according to importance of D2D service processed by the each D2D terminal and priority of the D2D service; and adjusting an amount of the time-frequency resource in the abnormal time-frequency resource pool according to resumption of the interrupted direct terminal-to-terminal communication after the each D2D terminal is wirelessly disconnected from the device having the base station functionality.

9. The method of claim 8, further comprising at least one of:

receiving signaling relating to wireless link resuming process to determine the resumption of the interrupted direct terminal-to-terminal communication according to the signaling relating to the wireless link resuming process; and receiving the resumption of the interrupted direct terminal-to-terminal communication reported by the each D2D terminal.

10. The method of claim 1, further comprising:
adjusting an amount of the time-frequency resource under each allocation mode according to the number of D2D terminals to be scheduled.

11. A device having base station functionality, comprising:
a memory storing one or more computer-readable program codes; and
a processor configured to execute the one or more computer-readable program codes to:
obtain at least one of time-frequency resource usage of the device having the base station functionality and state information of each D2D terminal within a coverage area of the device having the base station functionality;
determine an allocation mode of allocating time-frequency resource to the each D2D terminal, according to the at least one of the time-frequency resource usage of the device having the base station functionality and the state information of the each D2D terminal; and
allocate time-frequency resource used for direct terminal-to-terminal communication to the each D2D terminal according to the allocation mode to enable the each D2D terminal to use the allocated time-frequency resource to perform the direct terminal-to-terminal communication,
wherein determining the allocation mode of allocating the time-frequency resource to the each D2D terminal according to the at least one of the time-frequency resource usage of the device having the base station functionality and the state information of the each D2D terminal comprises:
determining location information change of the each D2D terminal relative to the coverage area of the device having the base station functionality, according to a motion state of the each D2D terminal.

12. The device of claim 11, wherein determining the allocation mode according to the at least one of the time-frequency resource usage of the device having the base station functionality and the state information of the each D2D terminal comprises:
determining whether an amount of the time-frequency resource suitable for use in the direct terminal-to-terminal communication in the time-frequency resource is larger than or equal to a predetermined amount, wherein the time-frequency resource is used for transmitting uplink data and is scheduled by the device having the base station functionality; and
determining to adopt a time-frequency resource allocation mode of directly scheduling the each D2D terminal when determining that the amount of the time-frequency resource suitable for use in the direct terminal-to-terminal communication is larger than or equal to the predetermined amount.

13. The device of claim 12, wherein the processor is further configured to execute the one or more computer-readable program codes to:
switch from a currently adopted allocation mode of allocating the time-frequency resource used for the direct terminal-to-terminal communication to the each D2D terminal to a designated allocation mode when receiving a command which requests the designated allocation mode and is transmitted by the each D2D terminal.

14. The device of claim 11, wherein determining the allocation mode of allocating the time-frequency resource to the each D2D terminal according to the at least one of the time-frequency resource usage of the device having the base station functionality and the state information of the each D2D terminal further comprises:
determining to adopt an allocation mode of pre-distributing a time-frequency resource pool to allocate the time-frequency resource to any D2D terminal, when determining that the any D2D terminal is located at the edge of the coverage area of the device having the base station functionality.

15. The device of claim 14, wherein allocating the time-frequency resource used for the direct terminal-to-terminal communication to the any D2D terminal according to the allocation mode of pre-distributing the time-frequency resource pool comprises:
based on a first time-frequency resource pool used for the direct terminal-to-terminal communication and allocated by the device having the base station functionality and a second time-frequency resource pool used for the direct terminal-to-terminal communication and allocated by the device having the base station functionality in the target cell, selecting common time-frequency resource in the first time-frequency resource pool and the second time-frequency resource pool as time-frequency resource in the pre-distributed time-frequency resource pool; and
notifying the pre-distributed time-frequency resource pool to the any D2D terminal to enable the any D2D terminal to select the time-frequency resource used for the direct terminal-to-terminal communication from the pre-distributed time-frequency resource pool.

16. The device of claim 14, wherein the processor is further configured to execute the one or more computer-readable program codes to:
switch from the allocation mode of pre-distributing the time-frequency resource pool to a time-frequency resource allocation mode of directly scheduling the each D2D terminal, when determining that the any D2D terminal moves to the center of the coverage area of the device having the base station functionality.

17. The device of claim 11, wherein the processor is further configured to execute the one or more computer-readable program codes to:
notify an abnormal time-frequency resource pool distributed by the device having the base station functionality to the each D2D terminal to enable the each D2D terminal to select the time-frequency resource used for resuming interrupted direct terminal-to-terminal communication from the abnormal time-frequency resource pool when the each D2D terminal is wirelessly disconnected from the device having the base station functionality.

18. The device of claim 17, wherein the processor is further configured to execute the one or more computer-readable program codes to perform at least one of:
distribute the abnormal time-frequency resource pool according to importance of D2D service processed by the each D2D terminal and priority of the D2D service; and
adjust an amount of the time-frequency resource in the abnormal time-frequency resource pool according to resumption of the interrupted direct terminal-to-terminal communication after the each D2D terminal is wirelessly disconnected from the device having the base station functionality.

19. The device of claim 18, wherein the processor is further configured to execute the one or more computer-readable program codes to perform at least one of:
receive signaling relating to wireless link resuming process to determine the resumption of the interrupted direct terminal-to-terminal communication according to the signaling relating to the wireless link resuming process; and
receive the resumption of the interrupted direct terminal-to-terminal communication reported by the each D2D terminal.

20. A method of resource allocation for direct terminal-to-terminal communication in a terminal, comprising:
receiving at least one of a first abnormal time-frequency resource pool notified by a device having base station functionality in a cell where the terminal is located currently, and a second abnormal time-frequency resource pool notified by a device having base station functionality in another cell;
when direct terminal-to-terminal communication performed by the terminal is interrupted since the terminal is wirelessly disconnected from the device having the base station functionality in the cell where the terminal is located currently, selecting time-frequency resource used for resuming interrupted direct terminal-to-terminal communication from at least one of the first abnormal time-frequency resource pool and the second abnormal time-frequency resource pool, wherein location information change of the terminal relative to a coverage area of the device having the base station functionality in the cell where the terminal is located is determined according to a motion state of the terminal, and the location information change of the terminal relative to the coverage area of the device having the base station functionality is used for allocating the time-frequency resource; and
resuming the interrupted direct terminal-to-terminal communication with the selected time-frequency resource,
wherein resuming the interrupted direct terminal-to-terminal communication with the selected time-frequency resource comprises at least one of:
receiving signaling relating to wireless link resuming process to determine the resumption of the interrupted direct terminal-to-terminal communication according to the signaling relating to the wireless link resuming process; or
receiving the resumption of the interrupted direct terminal-to-terminal communication reported by the terminal.

* * * * *

UNITED STATES PATENT AND TRADEMARK OFFICE
CERTIFICATE OF CORRECTION

PATENT NO. : 10,506,575 B2
APPLICATION NO. : 15/587749
DATED : December 10, 2019
INVENTOR(S) : Lei et al.

Page 1 of 1

It is certified that error appears in the above-identified patent and that said Letters Patent is hereby corrected as shown below:

In the Claims
In Claim 20, at Column 21, Line 27, after "selecting" add "a".
In Claim 20, at Column 22, Line 7, after "located" add "currently".
In Claim 20, at Column 22, Line 11, after "functionality" add "in the cell where the terminal is located currently".

Signed and Sealed this
Twenty-eighth Day of January, 2025

Coke Morgan Stewart
*Acting Director of the United States Patent and Trademark Office*